Aug. 30, 1932.   B. I. VIGNAUX, JR., ET AL   1,874,393
EGG PACKING APPARATUS
Filed March 30, 1931
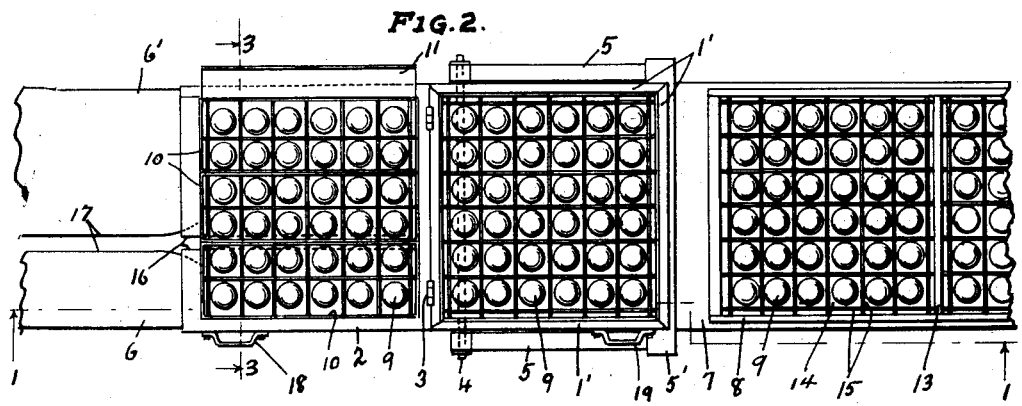
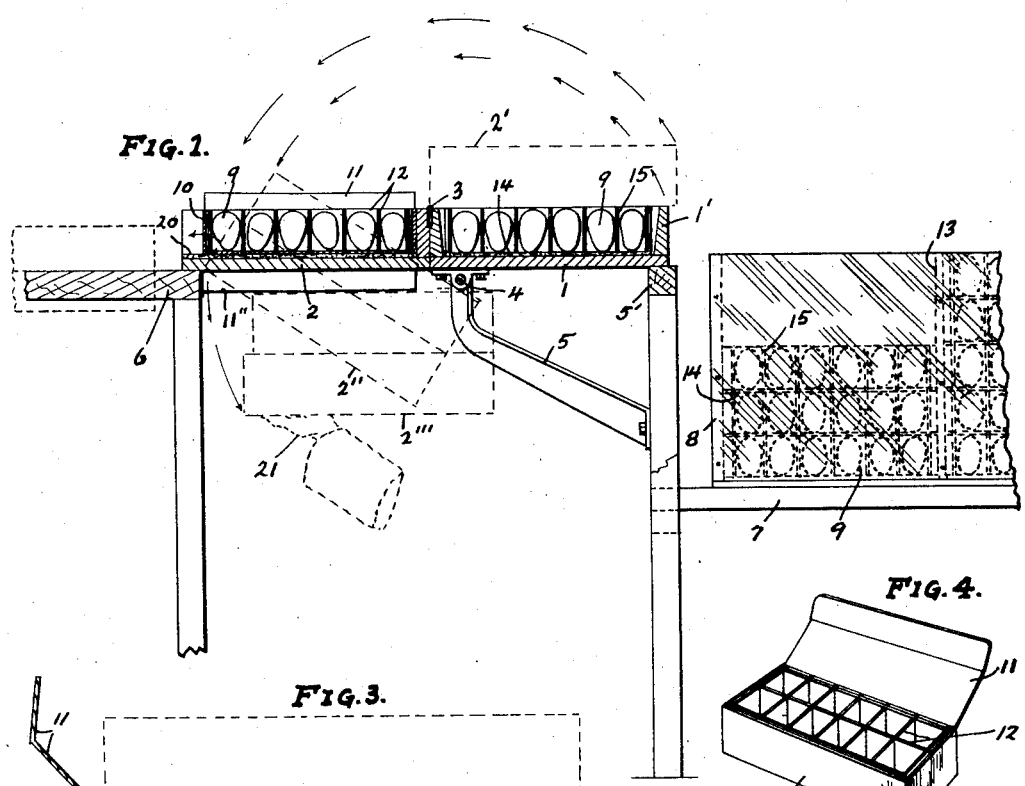
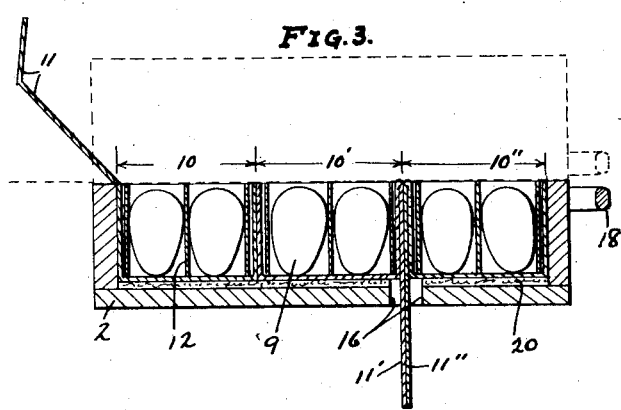
INVENTORS
Bernard I Vignaux Jr.
Marvin Roberts
BY Miller, Boykin & Bried
ATTORNEYS.

Patented Aug. 30, 1932

1,874,393

UNITED STATES PATENT OFFICE

BERNARD I. VIGNAUX, JR., AND MARVIN ROBERTS, OF SAN FRANCISCO, CALIFORNIA

EGG PACKING APPARATUS

Application filed March 30, 1931. Serial No. 526,504.

This invention relates to the packing of eggs and has for its objects apparatus for transferring eggs from large boxes or crates to the cartons holding a dozen as sold in the retail stores. Other objects are such apparatus which will be simple to construct, efficient in use, and which will avoid any danger of breaking the eggs. Other features of the invention will appear in the following description and accompanying drawing.

In the drawing Fig. 1 is an elevation, partly in section showing our apparatus in position of use and as seen from the line 1—1 of Fig. 2.

Fig. 2 is a plan view of Fig. 1.

Fig. 3 is an enlarged cross section of Fig. 2 as seen from the line 3—3 of Fig. 2.

Fig. 4 is a perspective view of an egg carton to hold a dozen eggs.

In further detail, the apparatus comprises principally a pair of frame sections 1, 2 or trays hinged together at 3 and with section 1 further hinged or pivoted as at 4 to rigid supports 5 all in a manner permitting the sections to open out flat as shown in full lines in the drawing with section 1 resting at its free end on supporting frame 5', while section 2 rests at its free end upon fixed shelves 6, 6', while also permitting either section to be folded over, or inverted over the other section.

Frame 5' is provided with a relatively low shelf or table portion 7 upon which is placed a crate 8 of eggs 9 which are to be transferred to cartons as shown at 10 in Fig. 4 which are provided with a flap cover 11 scored to the body of the carton, and cardboard separators 12 spacing the interior of the carton to hold one dozen eggs arranged in two rows of six eggs each.

The crates 8 in which eggs are received before transferring to these cartons hold thirty dozen eggs in five layers. The crate or box is divided centrally by a vertical partition 13 at opposite sides of which are fifteen dozen eggs, each layer of three dozen supported on a sheet of soft cardboard material 14 with the eggs thereon laterally spaced by notched cardboard partitions or separators 15.

Tray 1 has four side walls 1' and is of a size to receive one layer of three dozen eggs from the crate as indicated in Fig. 1, the sides of the tray being inwardly beveled as indicated to admit the fingers of a person lifting a layer of eggs out of the crate and depositing them complete with separators and supporting sheet 14 into the tray.

Tray section 2 is about like section 1 except that one side wall is omitted as shown at the left side of Figs. 1 and 2, and the bottom wall is slotted as at 16 to coincide with a slot 17 between shelf sections 6, 6' when the tray rests upon it as shown in Fig. 2 for a purpose to be later explained. The tray sections are preferably provided with handles 18, 19 so arranged that they may be held in separate hands, or when the tray sections are closed one upon the other, the handles lie close together so that they may both be simultaneously with the fingers of one hand to lift or swing both tray sections simultaneously over pivot 4.

Tray section 2 is made of an internal dimension to tightly receive three empty cartons 10 so that they will not fall out when the tray is inverted. In Fig. 3 three cartons are shown in place and include the material embraced respectively between arrows 10, 10', 10''. Flap 11 of carton 10 is placed against an outer wall of the tray and permitted to project outwardly as shown in Fig. 3, while the flaps 11' and 11'' of the other two cartons are placed back to back and passed downward through slot 16 of the tray. The three open cartons complete with their separators are held firmly in place within tray 2 resting upon a heavy layer of felt 20 and all in such a manner that tray 2 may be swung over on hinge pivot 3 to an inverted dotted position 2' shown in Fig. 1, then both trays are reversed and swung to the left over pivot 4 successively to positions dotted at 2'' and 2''' while supporting the lower section of the tray with the hand as indicated at 21 in Fig. 1. The eggs will then drop out of section 1 to section 2, and the next move is to raise the trays on pivot 4 until they clear the shelf 6, whereupon section 1 is lifted from section 2 and continued over to rest on support 5 while section 2 with its dozen eggs in place is (by the act of swinging section 1 over to stopping point) raised at its hinged end and slidably forced over the shelf 6 to be supported as shown in Fig. 1 and whereupon the three cartons will have become filled with a dozen eggs each and the cartons may be simultaneously slid out of the tray to the shelf 6, 6' while the downwardly projecting flaps 11 and 11" pass along the slot 17. Three new cartons are then inserted in tray 2 as described, the separators and lower sheet are removed from tray 1, a fresh layer of eggs, separators and supporting sheet are lifted from crate 8 and the operations continued.

In Figs. 1 and 2 tray 1 is shown refilled with a layer of eggs before the cartons in section 2 have been slid out, but it is optional as to when the cartons are slid out of tray 2. In fact this may be done by another operative standing in front of shelf 6 whose duty it is to slide the filled cartons out of the tray and place fresh cartons therein, while the operative manipulating the trays reaches for a new layer of eggs in the crate.

Having thus described our invention we claim:—

1. Egg packing apparatus comprising a pair of frames, one adapted to receive a layer of spaced eggs, the other adapted to receive a plurality of open cartons with closing flaps, means for bringing the frame of eggs in inverted position over the frame of cartons for transferring the eggs thereto, the frame for holding the cartons so shaped as to permit sliding the filled cartons laterally therefrom, and the frame provided with a slotted bottom adapted to receive a back-folded closing flap of a carton.

2. Egg packing apparatus comprising a pair of frames, one adapted to receive a layer of spaced eggs, the other adapted to receive a plurality of open cartons with closing flaps, means for bringing the frame of eggs in inverted position over the frame of cartons for transferring the eggs thereto, the frame for holding the cartons so shaped as to permit sliding the filled cartons laterally therefrom, and the frame provided with a slotted bottom adapted to receive a plurality of back-folded closing flaps of the cartons.

3. Egg packing apparatus comprising a pair of trays hingedly connected together for folding together box-like and opening out flat, one of said trays being of a size to receive a layer of eggs supported on a mat spaced by separators, the second tray being of a size to receive a plurality of egg cartons and formed with a slotted bottom adapted to receive the back-folded closing flaps of some of the cartons, and an open side so that the cartons may be slid laterally therefrom, and means supporting said trays for swinging of either one over the other.

4. Egg packing apparatus comprising a pair of trays hingedly connected together for folding together box-like and opening out flat, means pivotally supporting one of said trays whereby when they are closed together both may be inverted together on said means, a shelf arranged to clear the trays in their passage when being inverted, and to be overlapped when the uppermost is swung away from the lower one on its hinge connection thereto after such inversion.

5. Egg packing apparatus comprising a pair of trays hingedly connected together for folding together box-like and opening out flat, means pivotally supporting one of said trays whereby when they are closed together both may be inverted together on said means, a shelf arranged to clear the trays in their passage when being inverted, and to be overlapped when the uppermost is swung away from the lower one on its hinge connection thereto after such inversion, and a support for holding the latter tray in horizontal position to receive a charge of eggs.

6. Egg packing apparatus comprising a pair of trays hingedly connected together for folding together box-like and opening out flat, one of said trays formed to receive a layer of spaced eggs, and the other tray formed to receive and hold in position a plurality of open egg cartons whereby when the trays are folded together and inverted the eggs will be transferred to said cartons, and means in the last-mentioned tray to accommodate the closing flaps of the cartons to present an unobstructed surface over the cartons.

7. Egg packing apparatus comprising a pair of trays adapted to fit face to face in box-like formation and provided with means for aligning them in such position, one of said trays formed to receive a layer of spaced eggs, the other tray formed to receive and hold in position a plurality of open egg cartons and slotted to receive the closing flap of a carton whereby when the trays are placed together and inverted the eggs will be transferred to said cartons without interference of said flap.

8. Egg packing apparatus comprising a pair of trays hingedly connected together for folding together box-like and opening out flat, one of said trays formed to receive a layer of spaced eggs, and the other tray formed to receive and hold in position a plurality of open egg cartons whereby when the trays are folded together and inverted the eggs will be transferred to said cartons, the carton-holding tray formed with a slotted bottom through which the closing flaps of the egg cartons may be projected.

9. Egg packing apparatus comprising a pair of trays hingedly connected together for folding together box-like and opening out flat, one of said trays formed to receive a layer of spaced eggs, the other tray formed to receive and hold in position a plurality of open egg cartons whereby when the trays are folded together and inverted the eggs will be transferred to said cartons, the carton-holding tray formed with a slotted bottom through which the closing flaps of the egg cartons may be projected, and a slotted table arranged to support the carton tray with slots aligned for sliding transfer of the cartons from the tray to the table.

BERNARD I. VIGNAUX, Jr.
MARVIN ROBERTS.